Nov. 23, 1937.     C. R. PATON     2,099,703
MOTOR VEHICLE
Filed Dec. 5, 1932     2 Sheets—Sheet 1
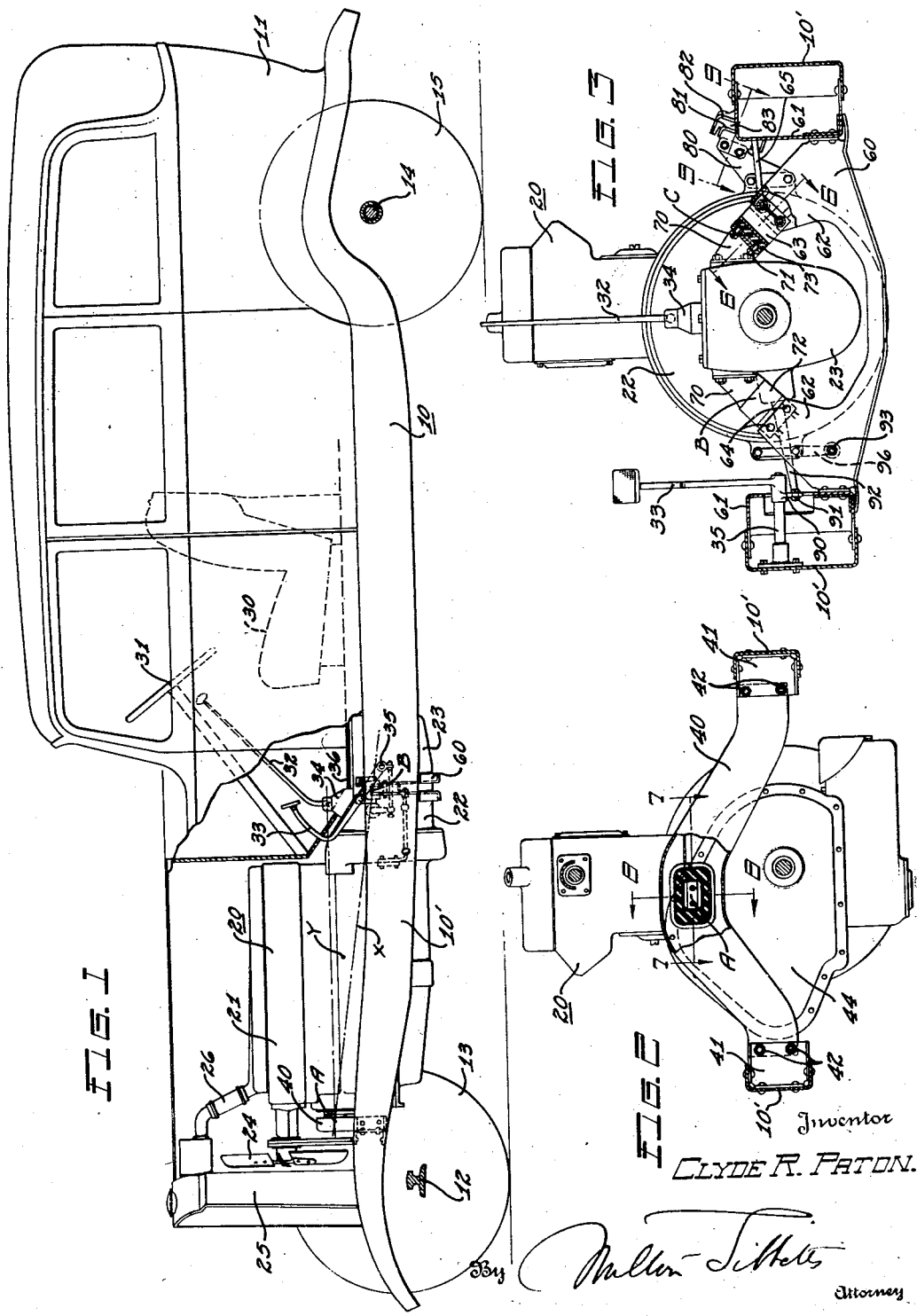
Inventor
CLYDE R. PATON.
By *[signature]*
Attorney Nov. 23, 1937. C. R. PATON 2,099,703
MOTOR VEHICLE
Filed Dec. 5, 1932 2 Sheets-Sheet 2
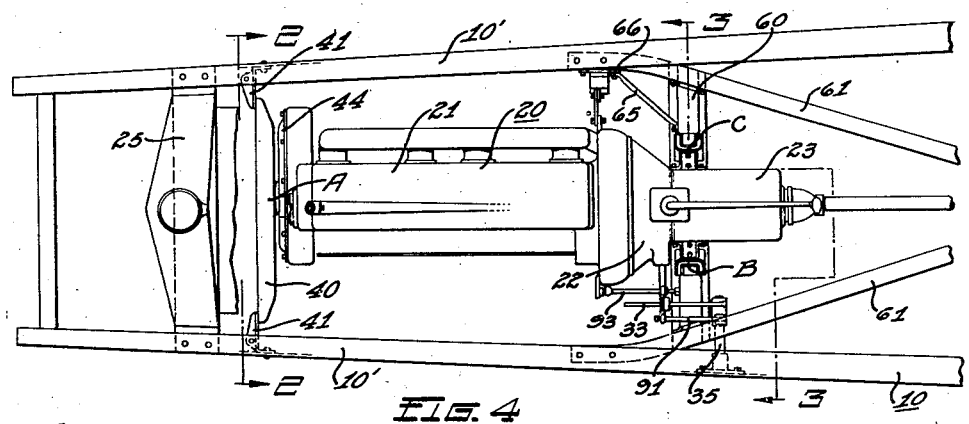
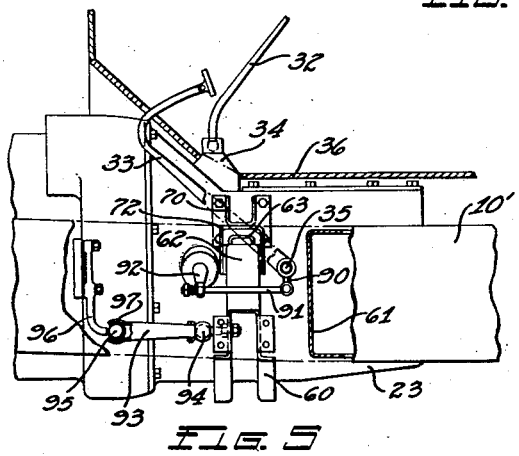
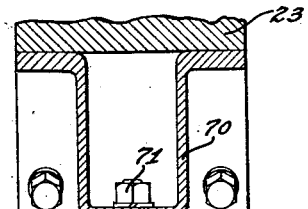
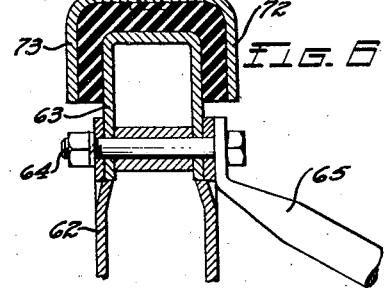
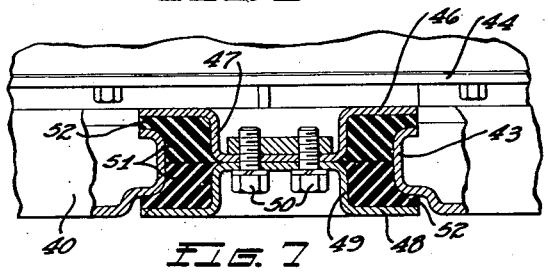
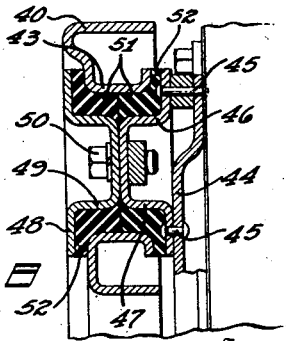

Patented Nov. 23, 1937

2,099,703

UNITED STATES PATENT OFFICE 2,099,703

MOTOR VEHICLE

Clyde R. Paton, Birmingham, Mich., assignor to Packard Motor Car Company, Detroit, Mich., a corporation of Michigan Application December 5, 1932, Serial No. 645,711

11 Claims. (Cl. 248—7)

This invention relates to motor vehicles and particularly to the means or method of supporting the engine or propulsion unit upon, or of connecting the unit to, the frame.

One of the objects of the invention is to so support the unit that there will be insulation of the unit from the frame without such movement of one relative to the other as to cause difficulties.

Another object of the invention is to provide sufficient initial flexibility in the engine mounting to insure cushioning of the torque reactions but with the further provision of means to definitely limit the amount of this movement so that said reactions will not build up at critical speeds.

Another object of the invention is to provide flexible supports for an engine or propulsion that will permit initial flexibility but which supports are sufficiently numerous and sufficiently spread that a firmness is obtained which will not permit undue movement of the unit relative to the frame.

Another object of the invention is to provide a somewhat flexible engine or propulsion unit support which confines the rocking movement of the unit in the frame to an axis passing substantially through the tower of the gear shift lever to thus minimize relative movement of the unit and the body at this point.

Another object of the invention is to provide a rigid connecting link between the engine or propulsion unit and frame co-operating with a unit control element such as the clutch operating shaft, for the purpose of confining the movement of the unit relative to the frame to a definite path so as not to interfere with the operation of the control element.

Another object of the invention is to so support the front end of the unit at a single point that there will be sufficient flexibility at that point as far as rotary movement of the engine is concerned due to reaction to its own impulses, but so that such supporting point will tend rather definitely to limit the torsional movements of the front end of the vehicle frame, such as are due to tramping action of the vehicle or to rough roads.

Other objects of the invention will appear from the following description taken in connection with the drawings, which form a part of this specification, and in which:

Fig. 1 is a side elevation of a motor vehicle made in accordance with the invention, parts being broken away to better illustrate the construction;

Fig. 2 is a somewhat enlarged vertical sectional view substantially on the line 2—2 of Fig. 4;

Fig. 3 is a somewhat enlarged vertical sectional view substantially on the line 3—3 of Fig. 4;

Fig. 4 is a plan view of the front portion of the vehicle shown in Fig. 1 with the body removed;

Fig. 5 is an enlarged side elevation of a portion of the vehicle adjacent the rear end of the engine unit, with a side frame member broken away;

Fig. 6 is an enlarged section on the line 6—6 of Fig. 3;

Fig. 7 is an enlarged section on the line 7—7 of Fig. 2;

Fig. 8 is an enlarged section on the line 8—8 of Fig. 2, and

Fig. 9 is an enlarged section on the line 9—9 of Fig. 3.

Referring to the drawings, 10 represents the vehicle frame and 11 is the body mounted thereon. The frame is composed of the usual side members and several cross members and with the body attached to it the frame and body become a structural unit, the rear portion of which, by reason of the body connection, is more rigid than the front portion. The front end of the frame therefore is subject to a torsional vibration about a neutral axis extending longitudinally of the frame. This may be caused by wheel wobble or axle tramp or otherwise by the road shocks to which the vehicle is subjected. The vertical location of this axis may, at the front of the car, lie near the plane of the frame side rails.

The front axle is indicated at 12, with its wheels 13, and the rear axle is shown at 14 with its wheels 15. These axles are connected in any suitable manner to the frame through the usual springs which are not shown in the drawings.

The engine or propulsion unit in general is indicated by the numeral 20, and as shown it comprises the engine part 21, the clutch part 22 and the gearing part 23, which three parts include suitable casings which may be made integral or in several sections. As shown the engine crank case is secured to the clutch casing and the clutch and gear casings are an integral casting.

At the front end of the engine is a fan 24 and its driving mechanism, and in front of the fan is the usual radiator 25 suitably supported on the frame 10. A flexible pipe 26 connects the upper part of the water jacket of the engine 21 to the upper part of the radiator 25, and a similar connection, not shown, is arranged between the lower part of the radiator and the engine water pump.

The driver's seat of the vehicle is indicated at 30 and in front of this seat is the usual steering wheel and column 31. Also extending into the front compartment of the vehicle and within easy reach of the driver is a gear shift lever 32 and a clutch lever 33, the former being adapted for operation by hand and the latter by the driver's foot, in the usual way. The gear shift lever 32 is mounted for universal pivotal movement in a short tower or casing 34 mounted on the clutch or gear casing, and the lower end of the lever extends into the gear casing for moving the shiftable gears. The clutch lever 33 is pivotally supported on the vehicle frame, as at 35, see Figs. 1 and 3. The tower 34 and the clutch lever 33 extend through suitable openings in the floor boards 36 of the vehicle.

The engine or propulsion unit 20 is supported on the frame at three points, A, B and C, the point A being at the front end of the engine unit and the points B and C being substantially separated from each other near the rear end of the unit. A plane through the centers of these three points is indicated at X in Fig. 1, and these points are so arranged with relation to the distribution of weight of the unit that the center of gravity of the unit is close to the plane X. Thus in the unit illustrated the center of gravity thereof is substantially at the point Y, in Fig. 1, which is just slightly above the plane X above referred to. Hence the three engine supports are well placed to resist the tendency of the unit as a whole to move laterally during the operation of the vehicle in turning or otherwise.

The engine support A is substantially in line horizontally with the pivotal mounting of the gear shift lever 32 in the tower or casing 34, and the supports B and C are so arranged and constructed relative to the tower 34, and the flexibility of these supports is such that the relative rotary movement of the engine, due to its reaction to the impulses thereof, is substantially on an axis passing through said tower 34 and the pivot of the gear shift lever, so that the rocking movement of the engine referred to produces a minimum of vibration of the tower and of the gear shift lever pivot, with respect to the floorboards 36 through which the tower passes. The specific construction of the supports B and C will be hereinafter described.

The front mounting A is shown in Figs. 1 and 2 and its details are illustrated in Figs. 7 and 8. The channel side members of the frame 10 may be referred to as 10' in the drawings, and a front cross member is indicated at 40. This cross member is removably secured to brackets 41 on the side members 10' as by the bolts 42. Adjacent the middle portion of the cross member 40 there is a rectangular opening and the metal of the web is bent in a U-shape to form the boundary of this opening as shown at 43 in Figs. 7 and 8. The rectangular opening is longer horizontally than it is vertically as particularly shown in Figs. 2, 7 and 8. A front cover 44 of the motor has riveted to it as at 45 a plate 46 which is formed with a rectangular boss 47 extending forwardly from the motor cover. A similar plate 48 with a reversely formed boss 49 is detachably secured to the plate 46 as by the bolts 50. The exterior diameter of the plates 46, 48 is greater than the opening in the cross member 40, and the rectangular bosses 47, 49, are somewhat smaller than that opening, thus leaving a rectangular space between the bosses and the U-shaped walls 43 of the cross member 40. Also, this rectangular space is narrower above and below the bosses than at the sides of the bosses.

The rectangular space referred to is filled with rubber or similar material, shown in the form of two rubber blocks 51 conforming to the rectangular space and having flanges 52 fitting between the sides of the U-shaped parts 43 and the flat portions of the plates 46, 48. This rubber filling is made in the form of two blocks instead of one, for the convenience of assembling.

With this construction the front end of the engine unit is supported on the cross member 40 of the vehicle frame through a flexible mounting which will permit limited rocking action of the engine about an axis passing through the middle of the bosses 47, 49 of the support A, but the rectangular shapes of the bosses and of the opening in the cross member 40 definitely limit this rocking motion. This support insulates the engine from the frame and by reason of the position of the support somewhat above the frame side members there is a distinct tendency on the part of the engine to limit or dampen the torsional movements of the front end of the vehicle frame such as are due to tramping action of the vehicle or to rough roads.

Thus it is a well recognized fact that rubber possesses considerable internal hysteresis, and when stressed, as by the application of forces in compression, tension, or shear thereto, develops heat. As a result, rubber is quite effective in damping vibrational disturbances, the mechanical energy of the vibrations being applied to the stressing of the rubber and being thereby dissipated in the form of heat.

The rear supports for the engine are shown in Figs. 3 and 4 and in some detail in Fig. 6. Here there is a frame cross member 60 riveted or otherwise secured to parts of the frame 10 such as the diagonally extending members 61 thereof. The cross member 60 extends beneath the gear casing 23 and has an upwardly extending arm 62 at each side of the gear casing and adjacent thereto. An inverted U-shaped member 63 is detachably connected as by bolts 64 to each of the arms 62, and a diagonal brace member 65 may be provided from the upper end of each arm 62 to a point at the side of the frame 10 where it is secured as at 66. Only one such brace member is illustrated.

Upon each side of the engine unit, adjacent the arms 62 is a bracket 70 having detachably secured to it as by bolts 71 an inverted U-shaped member 72 which is larger than and surrounds the U-shaped member 63, as shown particularly in Figs. 3, 4 and 6. Arranged between and preferably cemented or vulcanized or otherwise secured to the members 63 and 72 is a U-shaped block or cushion of rubber 73. Thus the rear portion of the engine unit is yieldably supported through these rubber blocks.

By reference particularly to Figs. 3 and 6 it will be seen that the rubber blocks 73 extend diagonally in a vertical plane transversely of the vehicle so that the rubber is in shear when resisting relative movement of engine and frame in a path substantially normal to a radius from the upper end of the gear shift tower 34. Since this is true of both of the rubber blocks, and since the front end of the engine is flexibly supported at a single point by the support A, the rocking action of the engine in the frame, due to the reaction of the impulses within the engine, will be substantially about an axis passing through the front support and through the gear shift lever tower, thus minimizing movement of the gear shift lever and tower due to such rocking action of the engine.

But the support of the rear portion of the engine through these mountings B and C is not on the rubber in shear, but mostly on the rubber in compression, and by reason of the diagonal arrangement of these supports the engine is firmly held within small limits so far as lateral bodily movement is concerned. Also, by reason of the U-shape of the rubber blocks 73, as shown in Fig. 6, the engine is quite definitely limited in its longitudinal movement in the frame. In this latter both the front and rear mountings lend assistance.

In some cases it is found desirable to more definitely limit the rocking action of the engine as referred to above and for this purpose the present invention provides a limit arm connection to the frame. There may be one or more of these arms. As shown, an arm 80 is detachably secured to one side of the engine unit and upon this is mounted a U-shaped member 81 which extends into a U-shaped member 82 secured to the side frame member 10'. Between these members 81, 82 is a rubber block 83 which is cemented or vulcanized or otherwise secured to them. Thus the rubber block 83 acts partly in shear and partly in compression as it operates to check the rocking action of the engine. It is shown as mounted substantially normal to a radius extending from the upper end of the tower 34 for most effective action.

It will be observed from the drawings that the rear supports are disposed in a horizontal plane which passes below the front support, the relative position of the supports being such that the center of mass of the unit is disposed substantially in a plane intersecting the three supports. By means of this construction the engine unit is mounted in the chassis frame so as to be quite stable laterally and the three supports define the rocking axis of the engine unit and dampen and finally limit rocking action about such axis.

The clutch lever 33 and its pivotal support 35 on the frame 10 of the vehicle has been hereinabove described. It is connected to operate the clutch through an arm 90, a link 91 and a lever 92, the latter extending into the clutch housing and hence mounted on the engine unit. The flexible engine mounting above described will of course permit a limited amount of movement of the engine longitudinally of the frame and it is obvious that such movement would be likely to interfere with the operation of the clutch through this leverage. For the purpose of confining the movement of the engine relative to the frame to a definite path so as not to interfere with the operation of the clutch or other engine unit control elements, a guide link 93 is provided, which link is preferably substantially the same length as the link 91 and is shown as arranged parallel thereto. The link 93 is connected by a universal pivot 94 to the frame 10 or to the cross member 60 thereof and by a universal pivot 95 on a bracket 96 on the engine unit. Insulation is provided by means of bushings 97 preferably of rubber. This construction is particularly illustrated in Figs. 1, 3, 4 and 5.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination of a supporting frame, an engine unit including a gear shift lever pivoted thereon, and yielding supporting means acting between the forward and rearward ends of said unit and the frame, said yielding supporting means being so constructed and arranged that the rocking action of the engine due to torque reaction will be about an axis substantially through the pivot of said lever.

2. In a motor vehicle, the combination of a supporting frame, an engine unit including a gear casing and a gear shift lever pivotally mounted on the unit, a yielding support for the front end of the unit on the frame, said support and the pivot of said lever being substantially in the same horizontal plane, and two substantially separated yielding supports for the unit on the frame adjacent the gear casing portion of the unit, said engine unit supports defining the rocking action of the engine due to torque reaction on an axis substantially through said front support and the pivot of said lever.

3. In a motor vehicle, the combination of a supporting frame including a cross member, an engine unit having a portion extending above said cross member, supporting means for the unit on the frame including an upwardly extending arm on said cross member at one side of said unit, a yielding motor support between said arm and the side of said unit, and a diagonal brace member extending from the upper end of said arm to a side member of said frame.

4. Motor supporting means for motor vehicles provided with a propulsion unit including rigidly connected clutch and transmission housings and motor block mounted on the frame and having a gear shift lever pivotally supported in an upstanding tower on the transmission housing, said means comprising yielding laterally spaced supports acting between said frame and said transmission housing and a yielding support acting between said frame and the forward end of said motor block, said supports being constructed and arranged to carry the weight of said propulsion unit while allowing rocking movement of the latter about a longitudinal axis passing through said tower.

5. Motor supporting means for motor vehicles provided with a propulsion unit including rigidly connected clutch and transmission housings and motor block mounted on the frame and having a gear shift lever pivotally supported in an upstanding tower on the transmission housing, said means comprising yielding laterally spaced supports acting between said frame and said transmission housing and a single centrally disposed yielding support acting between said frame and the forward end of said motor block, said supports being constructed to limit lateral rocking movement of said propulsion unit principally to an axis passing through said tower.

6. In a motor vehicle, the combination with a vehicle frame, of a structurally rigid propulsion unit including a motor, clutch and transmission gearing and housings therefor, of yielding supporting means acting between the front end of the unit and the frame and permitting lateral rocking movement of the unit on the frame, and two laterally spaced yielding supports connected between the frame and the unit adjacent the rear end of the latter and at opposite sides of the unit, said rear supports being arranged lower than said front supporting means, a gear shift lever for selecting said transmission gearing, and a tower on said transmission housing in which said lever is supported for pivotal movement, each of said rear supports including members carried by said frame and unit respectively and provided with opposed, spaced cooperating surfaces defining generally parallel planes inclined with respect to the horizontal and vertical and having a deformable element interposed between said surfaces, the planes defined by the cooperating surfaces of the oppositely disposed rear supports being normal to lines intersecting at a point above said supports, said point defining with said front supporting means an axis of lateral rocking movement for said unit passing through said tower.

7. In a motor vehicle, the combination with a supporting frame, of an engine unit, a yielding support for the front end of the unit on the frame, two substantially separated yielding supports for the unit on the frame adjacent the rear end of the unit, the maximum yielding action of said rear supports tending to permit rocking action of the engine unit, said supports transmitting the weight of the engine unit to the frame, and a limit arm extending laterally from the engine unit and having a cushioned connection to the frame including rubber subjected principally to shearing stress on the occurrence of rocking movement of the engine unit.

8. In a motor vehicle, the combination of a supporting frame, an engine unit, unit supporting means on each side of said unit, each of said means including inverted U-shaped members one within the other and one of said members connected to said engine unit and the other connected to said frame, the sides of the U being disposed in planes transverse to the longitudinal axis of the vehicle, and a U-shaped rubber block positioned between and secured to said members acting in shear to afford the principal force exerted by the supporting means in opposition to relative movement of the engine unit and the frame in a direction defined by the plane of the base of the U and in general parallelism with the sides of the U.

9. In a motor vehicle having an engine unit, the combination with the chassis frame having side and cross members, and the engine unit comprising rigidly connected motor, clutch, and gear casings, of a single central support between the front end of said unit and the chassis frame at a point substantially above the side members thereof, said support comprising a rubber cushion formed to damp relative oscillations at the support, and two rear supports between said unit and the chassis frame, said rear supports being substantially separated and symmetrically arranged on opposite sides of said unit and each comprising a rubber cushion receiving the weight of the engine in compression and so that rocking of said unit due to motor impulses is resisted and damped by the rubber of said rear supports in shear, the position of said rear supports being lower than the front support and such that the center of mass of the unit is substantially in a plane intersecting the three supports whereby the engine unit is stable laterally in the chassis frame, and said three supports combining to define the rocking axis of the engine unit with relation to the chassis frame and to dampen and finally to limit such rocking action about such defined axis.

10. In a motor vehicle having an engine unit, the combination with the chassis frame having side and cross members, and the engine unit comprising rigidly connected motor, clutch, and gear casings, of a single central support between the front end of said unit and the chassis frame at a point substantially above the side members thereof, said support comprising a rubber cushion formed to damp relative oscillations at the support, and two rear supports between said unit and the chassis frame, said rear supports being substantially separated and symmetrically arranged on opposite sides of said unit and each comprising a rubber cushion receiving the weight of the engine in compression and so that rocking of said unit due to motor impulses is resisted and damped by the rubber of said rear supports in shear, the position of said rear supports being lower than the front supports and such that the center of mass of the unit is substantially in a plane intersecting the three supports whereby the engine unit is stable laterally in the chassis frame, and said three supports combining to define the rocking axis of the engine unit with relation to the chassis frame and to dampen and finally to limit such rocking action about such defined axis, said front and rear rubber cushions each having a confined portion extending transversely to the longitudinal axis of the vehicle for resisting movement of the engine unit in a longitudinal direction by compressive reaction of the rubber.

11. In a motor vehicle, the combination of a supporting frame, an engine unit, unit supporting means on each side of said unit, each of said means including U-shaped members one within the other and one of said members connected to said engine unit and the other connected to said frame, the sides of the U-shaped members being disposed in substantially parallel planes transverse to the longitudinal axis of the vehicle and extending in substantially the same direction from the bases thereof, and a U-shaped rubber block positioned between and secured to said members acting in shear to afford the principal force exerted by the supporting means in opposition to relative movement of the engine unit and the frame in a direction defined by the plane of the base of the U and in general parallelism with the sides of the U.

CLYDE R. PATON.